United States Patent
Pohl

(10) Patent No.: US 10,867,194 B2
(45) Date of Patent: Dec. 15, 2020

(54) IMAGE-BASED DETECTION SYSTEM

(71) Applicant: Intel IP Corporation, Santa Clara, CA (US)

(72) Inventor: Daniel Pohl, Puchheim (DE)

(73) Assignee: INTEL IP CORPORATION, Santa Clara, CA (US)

( * ) Notice: Subject to any disclaimer, the term of this patent is extended or adjusted under 35 U.S.C. 154(b) by 365 days.

(21) Appl. No.: 15/857,728

(22) Filed: Dec. 29, 2017

(65) Prior Publication Data

US 2019/0050655 A1 Feb. 14, 2019

(51) Int. Cl.
| | |
|---|---|
| G06K 9/00 | (2006.01) |
| G06T 7/50 | (2017.01) |
| G06T 7/20 | (2017.01) |
| B60T 7/12 | (2006.01) |
| G01S 17/00 | (2020.01) |
| B60T 8/17 | (2006.01) |
| G01S 17/89 | (2020.01) |
| B60T 7/22 | (2006.01) |
| G01S 17/50 | (2006.01) |
| G01S 17/931 | (2020.01) |

(52) U.S. Cl.
CPC ............ *G06K 9/00845* (2013.01); *B60T 7/12* (2013.01); *B60T 7/22* (2013.01); *B60T 8/17* (2013.01); *G01S 17/00* (2013.01); *G01S 17/50* (2013.01); *G01S 17/89* (2013.01); *G01S 17/931* (2020.01); *G06T 7/20* (2013.01); *G06T 7/50* (2017.01); *B60T 2201/022* (2013.01); *B60T 2201/03* (2013.01); *B60T 2201/12* (2013.01); *B60T 2220/04* (2013.01); *G06T 2207/10028* (2013.01); *G06T 2207/30268* (2013.01)

(58) Field of Classification Search
CPC ..... G06K 9/00845; G01S 17/931; B60T 8/17; B60T 2201/12; B60T 2201/03; B60T 2220/04
See application file for complete search history.

(56) References Cited

U.S. PATENT DOCUMENTS

| | | | | |
|---|---|---|---|---|
| 5,835,008 A | * | 11/1998 | Colemere, Jr. | ......... B60Q 1/441 340/439 |
| 5,921,641 A | * | 7/1999 | Lupges | ................... B60T 7/042 303/191 |
| 6,002,329 A | * | 12/1999 | Marks | ...................... B60Q 1/44 180/272 |

(Continued)

FOREIGN PATENT DOCUMENTS

JP 2007-118861 * 5/2007

OTHER PUBLICATIONS

Wikipedia, "Collision avoidance system", https://en.wikipedia.org/wiki/Collision_avoidance_system, retrieved on Mar. 14, 2018.

*Primary Examiner* — Michael J Zanelli
(74) *Attorney, Agent, or Firm* — Viering, Jentschura & Partner MBB

(57) ABSTRACT

Herein is disclosed an image-based detection system comprising, one or more image sensors, configured to receive images of a vicinity of a control; and one or more processors, configured to identify within the images a control actuator and the control; detect a trigger action of the control actuator relative to the control based on the images; and switch from a normal control mode to a safety mode according to the detected trigger action.

18 Claims, 6 Drawing Sheets

(56) References Cited

U.S. PATENT DOCUMENTS

| | | | | |
|---|---|---|---|---|
| 6,474,753 | B1* | 11/2002 | Rieth | G05G 1/38 |
| | | | | 180/271 |
| 6,833,791 | B2* | 12/2004 | Bullinger | B60T 7/042 |
| | | | | 340/576 |
| 8,744,671 | B2* | 6/2014 | Abousleiman | G01L 5/225 |
| | | | | 701/34.4 |
| 10,351,147 | B2* | 7/2019 | Salter | G05D 1/0088 |
| 2003/0038715 | A1* | 2/2003 | Engelman | B60Q 1/44 |
| | | | | 340/439 |
| 2013/0245894 | A1* | 9/2013 | Huth | B60R 21/013 |
| | | | | 701/45 |
| 2017/0369073 | A1* | 12/2017 | Huber | B60W 30/08 |
| 2018/0015926 | A1* | 1/2018 | Cunningham | B60W 30/18136 |

* cited by examiner

IMAGE-BASED DETECTION SYSTEM

TECHNICAL FIELD

Various aspects of the disclosure relate generally to image processing of driver movements for vehicle safety.

BACKGROUND

Motor vehicle collisions are commonly associated with injuries and fatalities. One cause of motor vehicle collisions is braking failure, such as braking too late or braking with inadequate force. Such braking failures prevent a motor vehicle from reaching zero velocity and thereby potentially avoiding a collision. Some modern motor vehicles include braking enhancement systems, which may monitor depression or release of the brake pedal and/or accelerator pedal, and from this information determine whether the force behind an already applied brake may desirably be increased.

SUMMARY

Herein is described an image-based detection system comprising one or more image sensors, configured to receive images of a vicinity of a control; and one or more processors, configured to identify within the images a control actuator and the control; detect a trigger action of the control actuator relative to the control based on the images; and switch from a normal control mode to a safety mode according to the detected trigger action.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1:
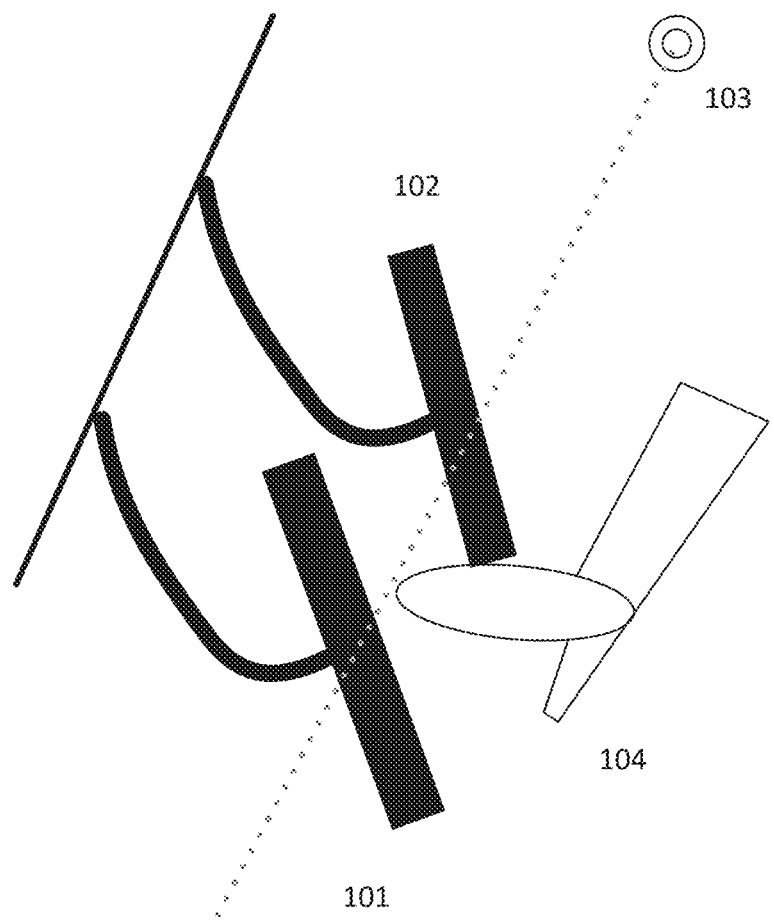
FIG. 1 depicts a driving well of the motor vehicle.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any aspect of the disclosure described herein as "exemplary" is not necessarily to be construed as preferred or advantageous over other aspects of the disclosure.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

The term "map" used with regard to a two- or three-dimensional map may include any suitable way of describing positions of objects in the two- or three-dimensional space.

Historically speaking, interactions between humans and machines have employed an operational-approach, whereby machines have been ideally configured to provide exactly the response corresponding to a given human input. For example, previous iterations of motor vehicles accelerated, braked, and turned in a one-to-one relationship with the human input applied to the accelerator pedal, brake pedal, and steering wheel, respectively. With the development of modern processors and sensors, it is possible to construct machines that can perform beyond the traditional operative-paradigm, whereby machines can infer or anticipate operator intention through operator action.

Sensors are used to receive information about operator action. Once the action is appreciated through the sensors, the corresponding action data is interpreted using one or more algorithms to infer or derive an operator intention or otherwise perform a function based on anticipated operator action. Herein the mechanism and principles for an inferential system for processor and human interaction are frequently described in relationship to a driver and a computer system within the context of a motor vehicle. It is noted that although the principles, methods, devices, and systems described herein may be used within a motor vehicle context, they may also have relevance within a broader context, such as in factories, utilities, or other areas of human-machine interaction.

FIG. 1 shows one or more image sensors used in a motor vehicle context, wherein the one or more image sensors are mounted within a driver-side well of a motor vehicle. The term "drive-side well" in this context is used to refer to the area on the driver-side of a motor vehicle that is demarcated by a driver-side floorboard, generally vertical side-walls that are typically on either side of the driver's feet, and the front and back boundaries that are generally demarcated by a front portion of the interior compartment in the foot-region and the driver's seat. In a conventional motor vehicle, the driver-side well area comprises a variety of controls including, but not limited to, a control 101, and a control actuator 102. In the context of a motor vehicle, the control 101 may be a brake pedal, and the control actuator 102 may be the driver's foot or shoe. In FIG. 1, one or more image sensors 103 are mounted to the side of the driver well, such that the one or more image sensors are able to obtain a lateral image of the control actuator 101 and the control 102. The one or more image sensors 103 may be configured to receive image data from a region above and/or in front of the control, such that they may obtain images of a control actuator 104. The control actuator 104 may be, but is not necessarily, the driver's foot or the driver's shoe. Within most countries including, but not limited to, the United States of America, the control actuator 104 in a motor vehicle may be the driver's right shoe or right foot. Nothing in this specification, however, should be limited to a right foot or a right shoe, as it is expressly anticipated that a left foot, left shoe, or any other human or human-controlled appendance may serve as the pedal actuator. In circumstances where a vehicle is configured in an alternative arrangement, such as where a vehicle has been modified to accommodate a disability, for instance, an alternative appendage or device may be used to actuate the control 101 or the control actuator 102. It is expressly anticipated that a left or right foot, left or right shoe, or any other human or human-controlled appendage may serve as the control actuator. It is anticipated that the principles described herein will apply to such modifications as well.

The one or more image sensors 103 may be configured to monitor the driver well occasionally or continuously, and to forward image data to one or more processors, which analyze the data and determine, based on a relationship between the control actuator and at least the control 101, whether a safety mode should be entered.

Figure 2:
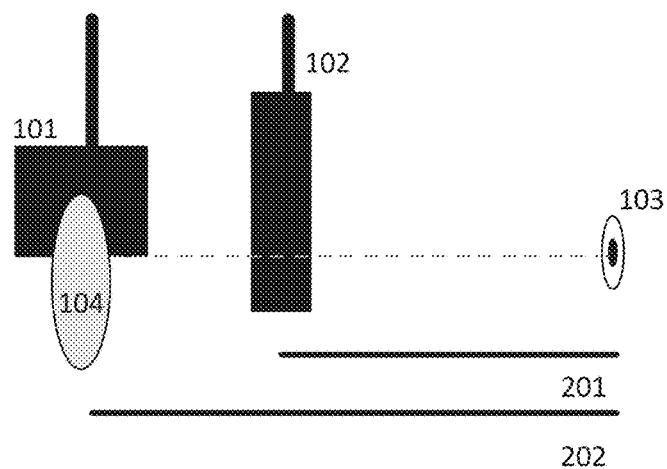
FIG. 2 depicts alignment of a driver's foot with a pedal using depth information.

FIG. 2 shows the use of depth information to determine a location of the control actuator with respect to the driver well and/or the vehicle pedals. The driver well is equipped with a control (brake pedal) 101, an accelerator pedal 102, and one or more image sensors 103 mounted on the side of the vehicle well. The one or more image sensors 103 may be configured to obtain depth information related to at least one of the brake pedal 101, the accelerator pedal 102, and a pedal actuator 104. Such depth-sensing image sensors may include cameras specifically equipped for depth determination. Alternatively, non-depth-sensing cameras may be used, wherein a plurality of cameras are present and obtain images of overlapping subjects from a plurality of perspectives, and wherein data from said cameras is transmitted to one or more processors for depth analysis.

In FIG. 2, the one or more image sensors 103 have a lateral view of the control (brake pedal) 101, a second control (accelerator pedal) 102, and the pedal actuator 104. Where the one or more image sensors 103 are fixedly mounted within the driver well, the one or more processors may be preconfigured with a distance measurement between the one or more image sensors 103 and the control (brake pedal) 101 and/or the one or more image sensors 103 and the second control (accelerator pedal) 102. Where such preprogrammed data is available, the one or more processors may receive data from the one or more image sensors 103 and thereby monitor a position of the control actuator 104 with respect to one or more pedals in the driver well. For example, the distance indicated by 201 corresponds to the distance between the one or more image sensors 103 and the accelerator pedal 102. The distance indicated by 202 corresponds to the distance between the one or more image sensors 103 and the control (brake pedal) 101. These may be calculated by the one or more processors processing data from the one or more image sensors, or they may be preprogramed distances. Where the pedal actuator 104 corresponds to one of these distances, it can be determined that the pedal actuator 104 is in lateral alignment with the braking pedal 101. It may also be determined whether the pedal actuator 104 is in lateral alignment with any other pedal, including, but not limited to the accelerator pedal 102.

Figure 3:
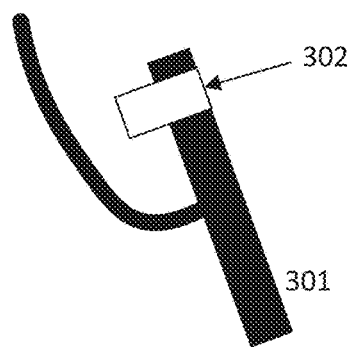
FIG. 3 depicts an image sensor embedded in a brake pedal.

FIG. 3 shows an arrangement of the one or more image sensors according to another aspect of the disclosure. In this figure, the one or more image sensors are mounted within a control, such as a pedal, as depicted by 302. In this case, the brake pedal according to this aspect of the disclosure 301 is equipped with the one or more image sensors 302. The one or more image sensors 302 are mounted inside and extending toward the front or top of the pedal, such that image data can be obtained from a region extending from the top of the pedal into the driver well. The one or more image sensors 302 may be mounted to obtain visual depictions of a control actuator 104 as it approaches the pedal 301. Where the one or more image sensors 302 are mounted within the pedal 301 as depicted herein, it may no longer be necessary to include a preprogrammed distance between the one or more image sensors and one or more pedals, as described above with respect to FIG. 2. Rather, each set of one or more image sensors 302 is associated with a specific pedal, and the presence of a pedal actuator in image data from a given set of the one or more image sensors 302 indicates that the pedal actuator 104 is in a lateral position with the corresponding pedal. According to this aspect of the disclosure, the one or more image sensors 302 may be grouped into a plurality of image sensors sets and mounted such that a plurality of pedals contain one or more image sensors.

Figure 4:
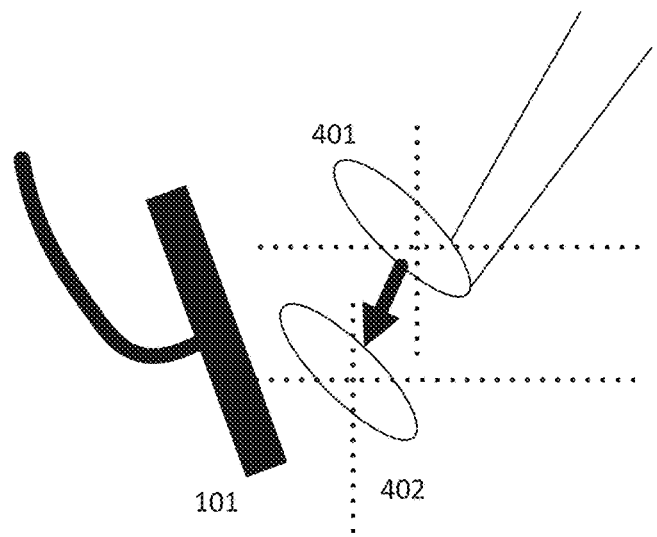
FIG. 4 depicts determination of factors related to an eminent depression of the brake pedal.

FIG. 4 depicts a calculation of movement of the control actuator. In this figure, pedal 101 is located within a vehicle driver well, and a control actuator is located in lateral alignment with the control 101. The one or more image sensors obtain image data comprising at least two images of the control actuator. Where the one or more image sensors are a video camera, or sensors capable of receiving video information, it is anticipated that the video frames will be taken in a regular interval, such that an elapsed time between one or more images may be calculated. That results in the capability to create a time-resolved image series. A position of the control actuator according to a first image is depicted as 401, and a picture of the control actuator according to a second image frame is depicted as 402. A comparison of these images allows for determination of multiple factors.

In a broad sense, it can be determined that the control actuator is moving toward the control 101. Where the one or more image sensors 103 are laterally mounted, a distance between the control 101 and the control actuator will be shown to decrease as the control actuator moves toward the control. By calculating the distance between the control and control actuator based on the image data, and by comparing a change in the distance, it can generally be determined whether the pedal actuator is stationary, moving toward the pedal, or moving away from the pedal. To calculate the movement or a distance of the control actuator relative to the control, the one or more processors may be programmed to interpret the image data through any known method of image or video processing. The one or more processors may be programmed to identify a control and a control actuator based on any feature. They may be configured to identify a focal point on each element (shown as crosshairs on FIG. 4) and to calculate movement of the control and the control actuator based on relative movement of the cross hairs.

Depending on a preset function within the one or more processors, the control actuator moving away from a braking pedal may indicate that braking within the immediate future is unnecessary or unlikely, and a subsequent entry into a safety mode may be undesirable. As will be described, a control actuator hovering over a control, or a control actuator moving toward the control may indicate that a safety mode is desirable. That is to say, a trigger action, which is an action that may cause initiation of a safety mode, may be a control actuator within a predetermined distance of a control, moving toward a pedal, or hovering above the pedal. These motions or actions may be further qualified to meet certain predetermined criteria such as threshold distances, durations, velocities, or accelerations to qualify as a trigger action. For examples, where a trigger action comprises hovering over a control, the trigger action may include additional factors such as a distance from the control in which the control actuator is hovering, and a duration of the hovering.

The one or more processors may be configured to determine a velocity of the control actuator based on a location of the control actuator within a plurality of images. By assessing a position of the control actuator relative to the control in a plurality of images, these changes in position may be assessed to estimate a velocity of the control actuator relative to the control. Using $$v = \frac{d}{t}$$

wherein d is a distance traveled by the control accelerator between a first image and a second image, and wherein time t is an elapsed time between the first image and the second image (which may be calculated at least by the frequency of frames and the number of elapsed frames between the first image and the second image). According to one aspect of the disclosure, a trigger action may be the pedal actuator moving toward the pedal at or above a predetermined velocity.

The one or more processors may be configured to determine an acceleration of the control actuator based on a change of velocity. Where at least three images depict a control actuator moving toward the control, a first velocity of the control actuator may be determined by comparing the first image to the second image, and a second velocity of the control actuator may be determined by comparing the second image to the third image. Acceleration may then be calculated as $$a = \frac{v_{image1and2} - v_{image2and3}}{t},$$

the change in the velocity derived from images one and two compared with the velocity derived from images two and three, divided by time. According to one aspect of the disclosure, the trigger action may be the acceleration of the control actuator exceeding a predetermined threshold.

Figure 5:
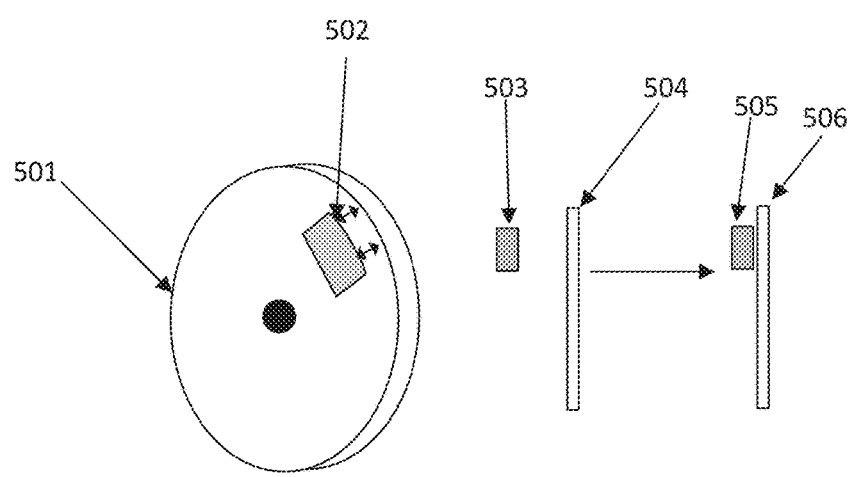
FIG. 5 depicts an engagement of a braking mechanism in response to a braking trigger.

FIG. 5 depicts a braking mechanism as operated according to an image-based braking system. Although the braking system depicted in this figure is depicted as a disk brake, it is anticipated that the devices and methods disclosed herein may be applied to any braking system, without limitation. In this case, the depicted braking system comprises at least a brake disc 501 and a brake pad 502. During normal operation, the brake pad 502 is calibrated to remain a distance from the brake disc 501, as shown by the arrows in the leftmost illustration of FIG. 5, which allows for comparatively unencumbered rotation of the brake disc 501. When the braking mechanism is engaged, the brake pad 502 is brought into physical connection with the brake disc 501, such that resulting frictional forces will slow, and may eventually stop, rotation of the brake disc. This is demonstrated in FIG. 5, wherein an unengaged braking system shows an unengaged brake pad 503 separated from the brake disc 504, which is compared to the engaged braking system, showing an engaged brake pad 505 creating a frictional force against the brake disc 506.

According to one aspect of the disclosure, initiation of the safety mode may comprise engaging the braking system, such that the brake pad 502 makes sustained connection with the brake disc 501, and wherein said sustained connection occurs before physical depression of the brake pedal 101 by the brake pedal actuator 104. That is to say, the one or more processors may detect movement of the control actuator 104 toward the control (in this case, a brake pedal) 101, and where said movement meets or exceeds a predetermined threshold, the safety mode may be initiated and thereby the braking system engaged as depicted in FIG. 5. This permits engagement of the braking system before depression of the braking pedal and thereby permits additional braking time, and thereby additional stopping force, to permit slowing or stopping before reaching a point of impact. The predetermined threshold as described herein is used to preclude braking system initiation during a neutral or non-emergency movement of the brake pedal actuator 104 toward the brake pedal 101. The predetermined threshold according to this aspect of the disclosure may be at least one of a velocity or acceleration of the brake pedal actuator 104 toward the brake pedal 101.

According to another aspect of the disclosure, the safety mode may comprise only brief engagement of the brake pad 502 with the brake disc 501. During normal vehicle operation, and under certain driving circumstances, the braking mechanism may become wet, or the braking mechanism may cool to a temperature below an ideal operational temperature. Because the braking mechanism may be most effective when operated while dry, and while within a specific temperature range, the braking mechanism may be briefly engaged, such that the resulting frictional forces cause a drying of at least one of the brake pad 502 or a region of the brake disc 501 on which the brake pad makes contact. The resulting frictional forces further cause a warming of the brake pad 502 and the corresponding portions of the brake disc 501. Thus, with a brief engagement of the brake mechanism, the braking mechanism may be primed for more efficient stopping for collision avoidance. Said brief engagement of the braking mechanism may occur for any predetermined period of time. According to one aspect of the disclosure, the predetermined period of time may be a period greater than zero seconds and less than or equal to one second. According to another aspect of the disclosure, this predetermined period of time may be greater than one second. The force used for the brief engagement of the brake pad 502 with the brake disc 501 may be any predetermined amount of force. The force may be selected to cause a rapid drying and/or warming of the braking mechanism. The force may be selected to result in a warming and/or drying of the braking mechanism such that the braking engagement is imperceptible or only minimally perceptible to a driver or passenger. According to this aspect of the disclosure, the trigger action may include at least one of an acceleration of the brake pedal actuator 104 beyond a predetermined threshold; a velocity of the brake pedal actuator 104 beyond a predetermined threshold; or a hovering (a sustained quasi-stationary holding) of the brake pedal actuator 104 in a region above or in front of the brake pedal 101.

According to another aspect of the disclosure, the safety mode may comprise adding supportive force to the braking mechanism. Under normal braking operation, the force applied to the braking mechanism corresponds to the force applied to the control 101 by the control actuator 104. Where a trigger action of the control actuator 104 is established, and therefore the safety mode is engaged, and where the control is a braking mechanism, for example, the safety mode may include the addition of supportive force to the braking mechanism beyond the force corresponding to the force applied by the control actuator 104 to the control 101. This aspect of the disclosure assumes that a trigger action may correspond to a higher than normal likelihood of a vehicle collision. By increasing the braking force beyond the braking force corresponding to the force applied to the brake pedal 101 by the brake pedal actuator 104, the velocity can be reduced beyond that which may otherwise be possible, and the likelihood of a collision can be correspondingly lessened. The trigger action according to this aspect of the disclosure may comprise a movement of the control actuator relative to the control at least one of a velocity or an acceleration beyond a predetermined threshold.

Figure 6:
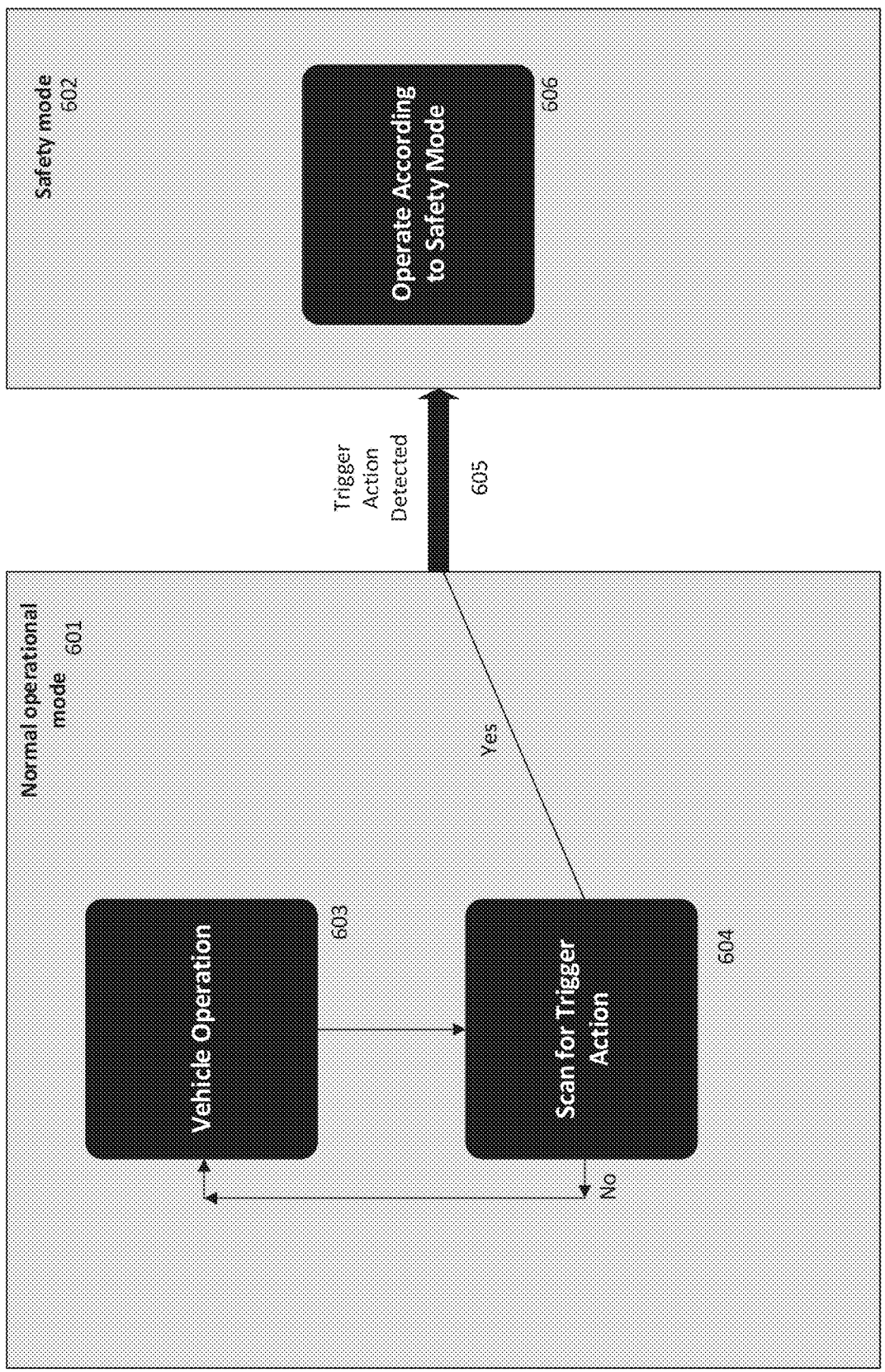
FIG. 6 depicts an operations flowchart for entry into safety mode.

FIG. 6 depicts an order of operations for a normal operational mode 601 and a safety mode 602. According to the normal operational mode 601, the vehicle is operated 603, and during the vehicle operation 603 a periodic or constant scanning for a trigger action 604 is performed. Where no trigger action is found, then the vehicle continues to perform according to normal vehicle operation 603, and the scan for a trigger action 604 is performed according to a predetermined schedule. Where a trigger action is detected 605, safety mode 602 is entered in the vehicle is operated according to the safety mode 606.

Figure 7:
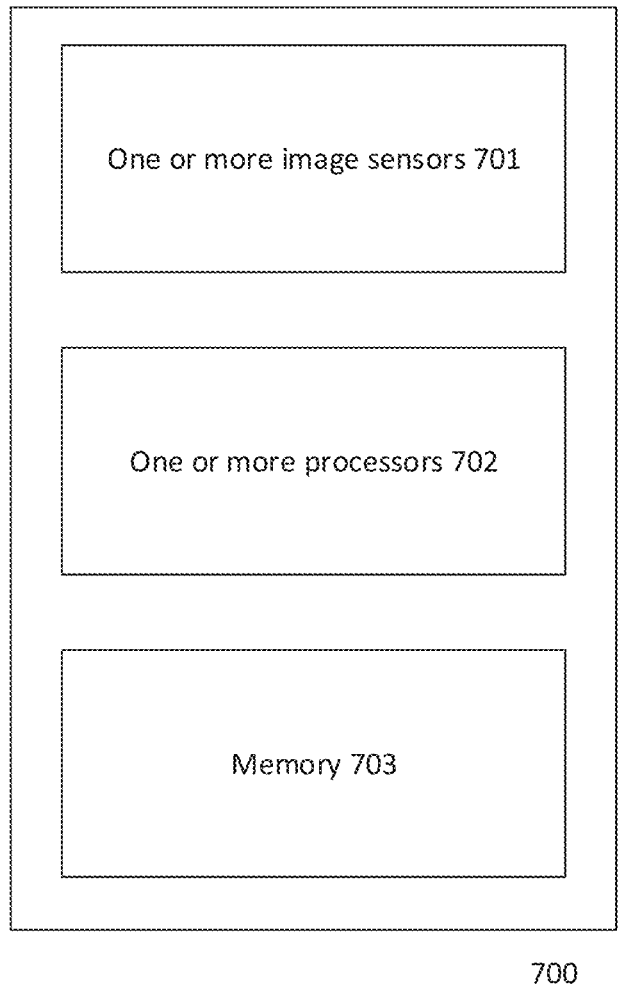
FIG. 7 depicts an image based safety system.

FIG. 7 depicts an image-based safety system 700 comprising, one or more image sensors 701, configured to receive images of a vicinity of a control; and one or more processors 702, configured to identify within the images a control actuator and the control; detect a trigger action of the control actuator relative to the control based on the images; and switch from a normal control mode to a safety mode according to the detected trigger action. The image-based safety system 700 may further comprise a memory 703 configured to store image data from the one or more image sensors.

Figure 8:
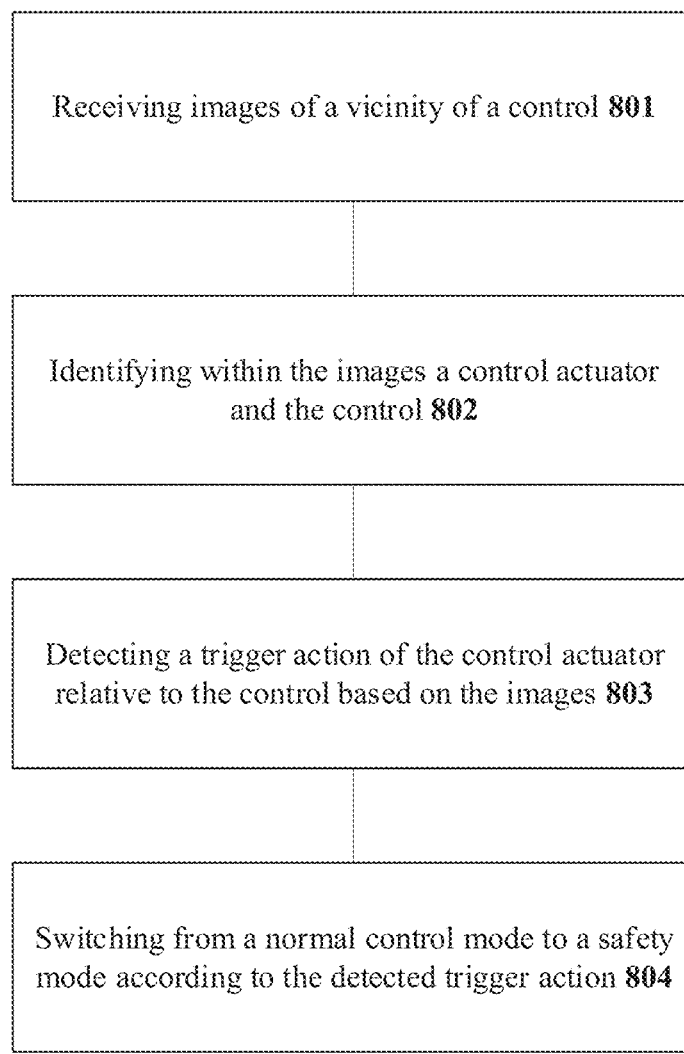
FIG. 8 depicts a method of image-based safety system operation.

FIG. 8 shows a method of image-based safety system operation 800 comprising, receiving images of a vicinity of a control 801; identifying within the images a control actuator and the control 802; detecting a trigger action of the control actuator relative to the control based on the images 803; and switching from a normal control mode to a safety mode according to the detected trigger action 804.

The image-based safety system may further comprise a memory. The memory may be configured to store image data received from the one or more image sensors. The memory may be further configured to store driver activity or behavior. The stored driver activity or behavior may be utilized for a learning or training procedure, such that the trigger action may be customized to reflect the habits or instincts of a given driver. Using historical actions of a driver or control actuator, the predetermined distances, velocities, accelerations, and durations for a trigger action may be adapted. This customization may permit tailored entry into the safety mode, such that the safety mode is not entered in response to neutral actions of the driver. The memory may be configured to store one or more driver profiles, such that the learned or trained information may be attributed to a specific driver, and the driver profile for a specific driver may be utilized for the corresponding driver operating the vehicle.

The one or more image sensors may be any type of image sensor capable of receiving image data from a surrounding. This may include, without limitation, a still camera, a video camera, an infrared camera, a night vision camera, a black-and-white camera, a color camera, a voxel camera, a thermal camera, or otherwise. The image sensors may comprise a plurality of cameras (stereo cameras), which are configured to obtain image data from largely overlapping regions, such that the resulting data, taken from different perspectives, can be assessed to determine corresponding depth information. Such depth information may be rendered according to any three-dimensional image convention including, but not limited to a voxel map, a point cloud, or otherwise. The one or more image sensors may be a depth camera configured to calculate depth information from its received image data. The one or more image sensors may be particularly configured for lowlight operation, or operation in complete absence of a visible light spectrum, to accommodate night-driving or the typical lighting conditions of a region surrounding a brake pedal.

The one or more sensors may be mounted anywhere such that the images received comprise at least one of an image of a controller or an image taken from the controller. According to one aspect of the disclosure, the one or more image sensors may be located in or on a wall of a driver-side vehicle well. In a typical motor vehicle configuration, a brake pedal (controller) and an accelerator pedal (additional controller) are mounted within an area above the driver-side floorboard, known as the driver well. The driver well conventionally comprises at least a floorboard, two lateral sides, a front, and a top compartment comprising vehicle operational components (steering, electrical, ventilation, etc.). The one or more image sensors may be mounted anywhere within the vehicle, including, but not limited to anywhere within this region. According to one aspect of the disclosure, the one or more sensors may be mounted on or within a lateral panel of the driver well, such that the one or more image sensors receive image data from one lateral side of the driver well to another. They may be installed laterally to the brake pedal and may be aligned slightly anteriorly to the brake pedal to obtain a clearer view of the pedal surface. They may be mounted such that they receive image data from a region anterior to the brake pedal surface, such that an approaching brake pedal actuator may be assessed for position, velocity, and/or acceleration.

According to another aspect of the disclosure, the one or more image sensors may be installed within a control, including, but not limited to a brake pedal. The one or more image sensors may be positioned to obtain image data from a region anterior to the control, such that the resulting image data may include data depicting a control actuator with respect to the control. As described above, the one or more image sensors may be configured to determine a depth information from the received images. Thus, where the one or more image sensors are located within a control, and receive information from a region anterior to the control, the depth information can be assessed to determine a distance between a control actuator and the control. A plurality of time-resolved images can be assessed to determine a velocity of the control actuator, and a plurality of time-resolved velocities can be assessed to determine a control actuator acceleration.

Throughout this disclosure, the region corresponding to the image data is described as comprising at least a region anterior to the control. For example, where the control is a brake pedal, it is understood that a conventional control configuration comprises a thin, principally rectangular surface having an anterior and posterior side. The posterior side is conventionally mounted to a braking arm that may serve as a lever for the braking mechanism. Given the ergonomics of a typical motor vehicle configuration, the braking mechanism is engaged by applying force to the anterior surface of the brake pedal. It is understood that the exact angle, direction, and point of application of the braking force depends on the relative heights and configurations of the braking pedal and the brake actuator, which will most often be a foot of the driver. Thus, where it is described herein to obtain image data from a region in the vicinity of, or adjacent to, and anterior surface of the brake pedal, it is understood that this is any region from which force is applied to the brake pedal by the brake actuator.

According to another aspect of the disclosure, the one or more image sensors may further be configured to obtain image data that includes a region of a second control. In the case of a motor vehicle, this may involve obtaining image data from both a brake pedal and an accelerator pedal. In a typical motor vehicle configuration, the accelerator pedal and the brake pedal are adjacent to one another and may often be included in the same image. This may be particularly true where the one or more image sensors are mounted to a lateral wall of the driver well. Where the image data includes an accelerator pedal, the one or more processors may identify the accelerator pedal and the brake pedal by their appearance, their relative distance from the one or more image sensors, or otherwise. The one or more processors may further use information regarding a position of the pedal actuator relative to the accelerator to determine whether a safety mode should be initiated. According to one aspect of the disclosure, a driver's rapid release of the accelerator pedal followed by a rapid depression of the brake pedal may indicate an emergency situation for which rapid and forceful braking is required. According to this aspect of the disclosure, the trigger action may be a release of the accelerator and a movement toward, or depression of, the brake pedal. The trigger action may include a completion of the trigger action within a predetermined time, particularly where the predetermined time is brief and thereby an indication of an emergency braking situation. Where this occurs, the one or more processors may be configured to initiate the safety mode while the brake actuator is approaching the brake pedal. Where the safety mode includes rapid and/or forceful initiation of the braking mechanism, this can result in the braking mechanism being initiated during a brief period before actual depression of the brake pedal, which may provide additional braking duration and/or additional braking force prior to reaching the point of impact, which may decrease or eliminate the likelihood of a collision. As described above, and according to another aspect of the disclosure, the braking mode may alternatively be configured to bring the brake pad closer to the brake disc, such that the brake may be more rapidly engaged upon depression of the brake pedal.

The one or more processors may be any processors capable of analyzing the image data as described herein and following the disclosed logic series for initiation of the safety mode. The processors may be configured as a system on Chip (SoC) or a CPU. The processors may be an integrated chip or integrated circuit. The processors may be a dedicated set of processors for emergency braking, or may be dedicated to multiple tasks including braking, such as in a central control system. The one or more processors may be housed anywhere within the motor vehicle.

The one or more processors may be configured to assess depth information to determine a position of the pedal actuator relative to at least one of the brake pedal or the accelerator pedal. For example, where the one or more image sensors are mounted on a lateral wall of the driver well, the distance information can be correlated with the distance between the image sensors and the brake pedal or a distance between the image sensors and the accelerator pedal. Thus, by determining a distance between the pedal actuator and the one or more image sensors, it can be determined whether the pedal actuator has a lateral alignment with the brake pedal or the accelerator pedal.

Where the one or more image sensors are mounted within one or more controls (such as being located in at least one of the brake pedal or the accelerator pedal), the one or more processors may be configured to determine a presence of a control actuator within one or more image feeds, associate the presence of the control actuator with a specific control (pedal, button) based on the image feed containing the control actuator, and use depth information to determine a distance between the control actuator and the control. Thus, where one or more image sensors are mounted within a brake pedal and one or more image sensors are mounted within an accelerator pedal, the one or more processors will be configured to identify the presence of a pedal actuator, determine which image feed the pedal actuator is found in, identify the pedal associated with that image feed, and determine a distance between the pedal actuator and that associated pedal.

The one or more image sensors may be configured to receive a plurality of images of a control actuator. The plurality of positions may be absolute positions, positions relative to the image field received by the one or more image sensors, positions relative to a pedal, or positions relative to any other stationary object depicted within the image data. The one or more processors may be further configured to determine a distance between the control actuator and a control within one or more of the plurality of images.

Where a control actuator is located in two different positions within successive images, the time resolved images may be compared and assessed to determine a velocity of the control accelerator. According to one aspect of the disclosure, the one or more image sensors will obtain images at a regular interval. This regular interval may be in interval such as is common for video feeds. According to one aspect of the disclosure, the frame rate may be twenty-four frames per second. Whatever the frame rate, the one or more processors may be configured to determine a time-resolved series of frames by calculating a time distance between frames using the known frame rate.

The one or more processors may be configured to perform a timed-resolution of said plurality of images, where a time-resolved plurality of positions of the pedal actuator may be determined. In light of the timed-resolution and the calculated distance, the velocity of a control actuator may be calculated. The one or more processors may be configured to divide a traveled distance of the control actuator by the elapsed time corresponding to the distance to determine the control actuator's velocity. This may be calculated based on any two video frames depicting a change in location of the control actuator, whether adjacent frames or non-adjacent frames. Given that the trigger action may be defined to require a threshold velocity or acceleration, it may become necessary to calculate the velocity to determine the satisfaction of a trigger action.

The one or more processors may be further configured to calculate acceleration. The technique described above to calculate velocity may be repeated to calculate acceleration. The acceleration may be understood as a change in velocity divided by time. Thus, for any three time-resolved frames depicting changes in position of the pedal actuator, a first velocity of the control actuator may be calculated using frame one and frame two, and a second velocity of the control actuator may be calculated using frame two and frame three; the first velocity and the second velocity may then be subtracted and divided by time to determine a pedal actuator acceleration. The one or more processors may be configured to determine the pedal actuator acceleration, such as where acceleration is a threshold value for a trigger action.

The control actuator may be any object used to apply force to a control. In a motor vehicle, this may most commonly be a foot of a driver or a shoe of a driver; however, any device used to apply force may be used as described herein. It is expressly considered that certain vehicle configurations may rely on alternative devices for application of force to the braking pedal. Where a foot-based pedal actuation is undesirable or impossible, a vehicle may alternatively be configured for hand or arm actuation. It is anticipated that the principles disclosed herein may be adapted to function with a hand- or arm-actuated device and are not limited to motor vehicles. Without limitation, the controls may be a pedal, lever, button, slide, switch, or otherwise.

Initiation of the safety mode requires a trigger action, which may be configured for a desired implementation. A trigger action typically comprises a physical relationship of the control actuator to the control (moving toward, moving away from, hovering above, etc.) and a qualifier (threshold velocity, threshold acceleration, threshold duration, etc.). In the context of a motor vehicle, the trigger action may comprise as at least one of an application of force to the brake pedal by the brake actuator; the brake actuator approaching the brake pedal; the brake actuator releasing the acceleration pedal and approaching the brake pedal; or the brake actuator hovering above the brake pedal. Each may require a qualifier, as will be addressed in turn.

Where the trigger action comprises the application of force to the brake pedal by the brake actuator, it may be desirable to increase a braking force or to perform pre-collision actions as will be described infra. Because most applications of the braking pedal are unremarkable and do not correspond to an emergency, the trigger action must typically be configured to include a qualifier aimed at distinguishing between an emergency situation and a non-emergency situation. This may be achieved with acceptable accuracy by including within the criteria for a trigger event a velocity threshold or an acceleration threshold, such that only rapid braking efforts trigger implementation of the safety mode.

Where the trigger action comprises the control actuator approaching the control (rather than requiring actual contact between the control and the control actuator), the safety mode may include at least one of a plurality of actions to initiate braking or pre-collision procedures before the control is depressed. Again, because most brake applications are routine and unremarkable, the trigger action may be defined to differentiate between a routine braking application and an emergency braking application. This can be achieved, inter alia, by selecting a threshold velocity or acceleration for control application. This may also be achieved by selecting a minimum duration for release of the accelerator pedal and approaching the brake pedal, which when occurring within a brief period of time, may indicate an emergent need to brake. Otherwise stated, emergent braking situations typically result in very rapid brake pedal application which may be much faster than a typical brake pedal application. Moreover, a rapid removal of a brake applicator from the accelerator followed by a rapid movement toward the brake pedal may be a strong indication of an emergency braking situation and may warrant entry into the safety mode.

Where the trigger action includes the brake actuator hovering above the brake pedal, it may be desirable to enter a safety mode to instigate preparatory braking actions or pre-collision measures. Drivers may encounter situations where braking is not yet warranted, but where there are strong indicia of a future need for braking. This may occur, for example, in a densely populated area or a school zone, where sudden pedestrian encounters are anticipated. Under such circumstances, a driver's natural response may be to remove a control actuator (a foot) from the accelerator pedal and to cause the pedal actuator to hover above the (control) brake pedal. This arrangement provides rapid access to the brake pedal where needed, without engaging the brake pedal until necessary. Because this configuration indicates a stronger than average likelihood of emergency braking, it may be desirable to perform actions to prepare for a possible braking emergency. These actions may include at least one of brief braking engagement to dry and warm the braking mechanism; movement of the brake pad toward the brake disc to allow more rapid braking when the brake pedal is eventually engaged; discontinuation of cruise control; or reducing a volume of an entertainment system. Where the trigger action includes the brake actuator hovering above the brake pedal, the trigger action may further include a predetermined duration for hovering above the brake pedal and/or a pre-determined distance from the brake pedal at which hovering occurs.

According to another aspect of the Disclosure, and wherein the trigger action includes the brake actuator hovering above the brake pedal, and in addition to, or instead of any other consequent steps performed in response to brake pedal hovering as described herein, a warning of a heightened likelihood of braking can be given to one or more additional vehicles. Such a warning may place other drivers on a heightened alert, such that they will be in a better position to react to a swift braking, should the need arise. Such a warning of a heightened likelihood of braking may be communicated to one or more additional vehicles by a visual signal. One such visual signal is an altered light signal, such as a dimmed brake light or a half-illuminated brake light. Where such a brake light is employed as a visual signal, the brake light may be powered at less than 100% power, such that the light is both visible and distinguishable from a non-illuminated brake light, and such that a reduction in power renders the light to be distinguishable from a brake light at 100% power. According to one aspect of the disclosure, the partially illuminated brake light may be a brake light at 50% power. Where the brake light is illuminated at less than 50% power, this may be understood as a signal that braking may be imminent.

Where a brake actuator is caused to hover above a brake pedal, a signal of potentially imminent braking may be wirelessly transmitted to one or more surrounding vehicles. According to one aspect of the disclosure, said signal may be transmitted vehicle a vehicle-to-vehicle ("V2V") transmission. The receiving vehicle may be programed to display or communicate the heightened risk of braking to the vehicle's driver in a predetermined manner, whether visually, audibly, or otherwise. The receiving vehicle may be programmed to perform any of the responsive actions as described herein, including, but not limited to, brake preparation, collision preparation, or otherwise. This signal may also or alternatively transmitted via Wi-Fi, WLAN, Bluetooth, or any other wireless communication technology.

A modifier for the physical relationship between the control and the control actuator may be selected according to a desired implementation. According to one aspect of the disclosure, the trigger action may include at least one of exceeding a predetermined duration of a trigger action; performing a trigger action in less than a predetermined duration; performing a trigger action at greater than a predetermined velocity; or performing a trigger action at greater than a predetermined acceleration. The trigger action may include, for example, a exceeding a predetermined duration of time where the trigger action is predicated on a hovering or sustained presence of the control actuator above a control. It may be undesirable to initiate a safety mode upon a very brief duration of the control actuator hovering above a control, and therefore the trigger action may be set to require a minimum duration of the control actuator hovering above the control before the safety mode is engaged.

The trigger action may be defined to include performance of an action in less than a predetermined duration, such as where the trigger action includes approaching and/or depressing the control. Routine approaches toward the control (such as with a brake pedal), or regular attempts at depressing the control will generally be slower than those approaches or depressions performed under emergency circumstances. Therefore, a durational threshold may be set, whereby an approach toward the brake pedal or a depression of the brake pedal occurring within a predetermined time threshold may be a trigger action. According to one aspect of the disclosure, the trigger action may include the release of the accelerator pedal and an approach toward or depression of the brake pedal performed within a minimum duration. The underlying rationale for this application is that a rapid release of the accelerator pedal followed by a rapid approach toward the brake pedal is highly indicative of an emergency braking situation.

The trigger action may include an approach toward the control at greater than a predetermined velocity or acceleration. With respect to velocity, an emergency application of the control may involve an approach or depression of the control at a greater velocity than a routine control application. Thus, a threshold velocity may be set to differentiate between a routine control application and an emergency control application. Similarly, an acceleration for an emergency control application may be greater than an acceleration for a routine control application. Accordingly, the trigger event may be defined to include a minimal acceleration threshold, said threshold being chosen to distinguish between a routine control application and an emergency control application.

Entry of the safety mode may include customizable responses for increased safety. Entry of the safety mode may be customized to include at least one of the following measures: momentary engagement and subsequent release of the braking mechanism; reducing a distance between a brake pad and a brake disc; sustained engagement of the braking mechanism; maximum engagement of the braking mechanism; supplemental force applied to the braking mechanism; application of the braking mechanism prior to depression of the brake pedal; disengagement of cruise control; reduction of the volume of an entertainment system; or pre-collision measures.

The term pre-collision measures is used herein to describe any measures that are taken to reduce harm to one or more occupants of the motor vehicle prior to a collision occurring. Pre-collision measures may include at least one of adjustment of a seat belt tension; adjustment of a seatbelt's lock; or adjustment of a seat position.

According to one aspect of the disclosure, the safety mode may comprise a momentary engagement and immediate release of the braking mechanism. The duration of braking between engagement and release may be configured according to a desired implementation. It is anticipated, however, under this configuration that the engagement is comparatively brief and not designed to significantly slow the vehicle. Where the safety mode is configured to include this brief braking engagement, the engagement may be designed to occur prior to depression of the brake pedal, such as when a brake actuator approaches the brake pedal, or where the brake actuator hovers above the brake pedal. Brief engagement of the braking mechanism may, through the transmission of frictional forces with the brake pad, result in drying of the brake pad and/or brake disc, as well as an increase of a temperature of the brake pad and/or brake disc. The drying action and increased temperature may prepare the braking mechanism for more forceful braking in the immediate future.

According to another aspect of the disclosure, the safety mode may include a reduction of distance between a brake pad and a brake disc before the brake pedal is depressed. This may occur, for example, where the control actuator hovers above the control (in this case a brake pedal) and satisfies the requirements for a trigger action, or where the control actuator approaches the control while satisfying the requirements for the trigger action. By reducing or eliminating a distance between a brake pad and a brake disc, the brake pad may be faster applied to the brake disc when the braking mechanism is engaged. For example, where a control actuator hovers above the control, the distance between the brake pad and brake disc may be reduced such that, where the control is depressed in an emergency braking situation, the brake pad travels a smaller distance before making contact with the brake disc, and thereby decreasing a delay before engagement of the braking mechanism.

According to another aspect of the disclosure, the safety mode may include an engagement of the braking mechanism prior to contact between the brake actuator and the brake pedal. This may occur where, for example, the control actuator approaches the control in such a way as to fulfill a trigger action. In this case, it may be assumed that the driver's intention is to engage the braking mechanism, and the braking mechanism it may thereby be engaged by the system described herein prior to contact between the control actuator and the control. This early actuation of the braking mechanism may result in a longer braking duration. This early actuation of the braking mechanism may result in a reduced velocity or complete stop prior to a point of collision.

According to another aspect of the disclosure, the safety mode may include supplemental force to the braking mechanism. Where the control actuator approaches the control in such a way as to fulfill a trigger action (such as with sufficient velocity or acceleration), it may be assumed that an emergency braking procedure is being initiated. Because additional braking force may result in a reduced velocity at a collision, or potentially avoidance of collision altogether, supplemental force may be applied to the braking mechanism beyond that which is otherwise applied by the control actuator.

According to another aspect of the disclosure, the one or more processors may be configured to learn from driver action and automatically adjust one or more elements of the trigger action to conform to the driver's driving habits. As is described throughout herein, the trigger action may include a qualifier that is selected to differentiate between a routine or unremarkable braking application and an emergency braking application. The timings, velocities, or accelerations which effectively distinguish between an emergency in a non-emergency braking application may be driver dependent. For example, a timing of switching between an accelerator pedal and a braking pedal, or a velocity of approaching braking pedal, may be dependent on a driver's age, strength, reflexes, etc. Because it may be desirable to have a trigger action that reflects a demarcation between a non-emergency an emergency situation, the one or more processors may be configured to monitor the regular control actuation habits of a given driver or operator and adjust a qualifier of the trigger action accordingly. For example, a plurality of velocities of a driver's approaching a brake pedal may be recorded, and the trigger action may be revised to include a velocity marginally outside of the non-emergency velocities recorded.

Where the one or more processors are configured for learning and revision of a trigger action, the revised trigger action may be stored according to a driver profile. The driver profile information may be stored in memory. The memory may be configured to store a plurality of driver profiles. The plurality of driver profiles may be configured such that a profile corresponding to a given driver may be selected as needed.

The methods and procedures described herein may alternatively be performed with a contact sensor rather than one or more image sensors. A contact sensor may be mounted on a pedal, such that a pedal actuator making physical contact with the pedal will trigger the actions described herein, such as braking, preparation for braking, preparation for collision, warning of imminent braking, or otherwise. The contact sensor may be a pressure sensor, switching sensor, or otherwise, such that the sensor is able to detect contact between a pedal actuator and the pedal.

In the following, various examples are provided with reference to the aspects described above.

In Example 1, an image-based detection system comprising, one or more image sensors, configured to receive images of a vicinity of a control; and one or more processors, configured to identify within the images a control actuator and the control; detect a trigger action of the control actuator relative to the control based on the images; and switch from a normal control mode to a safety mode according to the detected trigger action.

In Example 2, the image-based detection system of Example 1 is disclosed, wherein the one or more image sensors comprises at least one camera.

In Example 3, the image-based detection system of Example 2 is disclosed, wherein the at least one camera is a depth-sensing camera.

In Example 4, the image-based detection system of Example 1 or 2 is disclosed, wherein the one or more image sensors are configured to receive images of the vicinity of the control from at least two perspectives, and wherein the one or more processors are further configured to generate image depth information using the received images.

In Example 5, the image-based detection system of any one of Examples 1 to 4 is disclosed, wherein the one or more processors are further configured to determine an alignment between the control and the control actuator according to depth data.

In Example 6, the image-based detection system of Example 5 is disclosed, wherein the one or more processors are further configured to attribute an action of the control actuator to one of a plurality of controls based on the determined alignment.

In Example 7, the image-based detection system of any one of Examples 1 to 6 is disclosed, wherein the one or more image sensors are mounted in a driver well.

In Example 8, the image-based detection system of any one of Examples 1 to 6 is disclosed, wherein the one or more image sensors are mounted in the control.

In Example 9, the image-based detection system of any one of Examples 1 to 8 is disclosed, wherein the vicinity of the control comprises a region anterior to a depression-surface of a brake.

In Example 10, the image-based detection system of any one of Examples 1 to 9 is disclosed, wherein the vicinity of the control includes at least a brake and an accelerator.

In Example 11, the image-based detection system of any one of Examples 1 to 10 is disclosed, wherein the one or more processors are arranged as a System on Chip (SoC).

In Example 12, the image-based detection system of any one of Examples 1 to 11 is disclosed, wherein the images represent a time-resolved series of positions of the control actuator relative to the control.

In Example 13, the image-based detection system of any one of Examples 1 to 12 is disclosed, wherein the one or more processors are configured to determine a distance of the control actuator from the control within at least one image.

In Example 14, the image-based detection system of any one of Examples 1 to 13 is disclosed, wherein the one or more processors are configured to determine a velocity of the control actuator using the time-resolved series of positions of the control actuator relative to the control.

In Example 15, the image-based detection system of any one of Examples 1 to 14 is disclosed, wherein the one or more processors are configured to determine at least two time-resolved velocities of the control actuator, and using the at least two determined time-resolved velocities, determine an acceleration of the control actuator.

In Example 16, the image-based detection system of any one of Examples 1 to 15 is disclosed, wherein the one or more processors are configured to determine a period or movement or a period of non-movement of the control actuator relative to the control.

In Example 17, the image-based detection system of any one of Examples 1 to 16 is disclosed, wherein the trigger action comprises a movement of the control actuator toward the control at greater than a predetermined velocity.

In Example 18, the image-based detection system of any one of Examples 1 to 17 is disclosed, wherein the trigger action comprises a movement of the control actuator toward the control at greater than a predetermined acceleration.

In Example 19, the image-based detection system of any one of Examples 1 to 18 is disclosed, wherein the trigger action comprises a release from an accelerator and a movement toward the control within a predetermined duration.

In Example 20, the image-based detection system of any one of Examples 1 to 19 is disclosed, wherein the trigger action comprises a release from an accelerator and a movement toward the control at greater than a predetermined velocity.

In Example 21, the image-based detection system of any one of Examples 1 to 20 is disclosed, wherein the trigger action comprises the control actuator hovering relative to the control.

In Example 22, the image-based detection system of Example 21 is disclosed, wherein the trigger action comprises the control actuator hovering relative to the control for greater than a predetermined duration.

In Example 23, the image-based detection system of any one of Examples 1 to 22 is disclosed, wherein the trigger action comprises the control actuator hovering above the control within a predetermined distance from the control.

In Example 24, the image-based detection system of any one of Examples 1 to 23 is disclosed, wherein the safety mode comprises momentary engagement and release of a braking mechanism.

In Example 25, the image-based detection system of any one of Examples 1 to 24 is disclosed, wherein the safety mode comprises reducing a distance between a brake pad and a brake disc before the control is depressed.

In Example 26, the image-based detection system of any one of Examples 1 to 25 is disclosed, wherein the safety mode comprises engagement of a braking mechanism prior to contact between the control actuator and the control.

In Example 27, the image-based detection system of any one of Examples 1 to 26 is disclosed, wherein the safety mode comprises engagement of a stopping mechanism prior to contact between the control actuator and the control.

In Example 28, the image-based detection system of any one of Examples 1 to 27 is disclosed, wherein the control is a brake mechanism, and wherein the safety mode comprises providing supplemental force to the brake mechanism in excess of any force applied by the control actuator to the control.

In Example 29, the image-based detection system of any one of Examples 1 to 28 is disclosed, wherein the safety mode comprises disengaging a cruise control.

In Example 30, the image-based detection system of any one of Examples 1 to 29 is disclosed, wherein the safety mode comprises locking one or more safety belts.

In Example 31, the image-based detection system of any one of Examples 1 to 30 is disclosed, wherein the safety mode comprises adjusting one or more seats for impact.

In Example 32, the image-based detection system of any one of Examples 1 to 31 is disclosed, wherein the control is a brake.

In Example 33, the image-based detection system of any one of Examples 1 to 32 is disclosed, wherein the control is a motor vehicle brake.

In Example 34, the image-based detection system of any one of Examples 1 to 33 is disclosed, wherein the control is a pedal.

In Example 35, the image-based detection system of any one of Examples 1 to 34 is disclosed, wherein the control is a button.

In Example 36, the image-based detection system of any one of Examples 1 to 35 is disclosed, further comprising a memory, configured to store image data from the one or more image sensors.

In Example 37, the image-based detection system of Example 36 is disclosed, wherein the memory is further configured to store driver activity.

In Example 38, the image-based detection system of Example 37 is disclosed, wherein the memory is further configured to store at least one driver profile.

In Example 39, the image-based detection system of Examples 37 or 38 is disclosed, wherein the one or more processors are further configured to modify an element of a trigger action based on at least a stored driver activity or a stored driver profile.

In Example 40, the image-based detection system of any one of Examples 1 to 39 is disclosed, wherein the one or more processors are further configured to change a predetermined velocity for a trigger action based on at least a previous action of the control actuator relative to the control.

In Example 41, the image-based detection system of any one of Examples 1 to 39 is disclosed, wherein the one or more processors are further configured to change a predetermined acceleration for a trigger action based on at least a previous action of the control actuator relative to the control.

In Example 42, the image-based detection system of any one of Examples 1 to 39 is disclosed, wherein the one or more processors are further configured to change a predetermined duration for a trigger action based on at least a previous action of the control actuator relative to the control.

In Example 43, an image-based detection method is disclosed, comprising receiving images of a vicinity of a control; identifying within the images a control actuator and the control; detecting a trigger action of the control actuator relative to the control based on the images; and switching from a normal control mode to a safety mode according to the detected trigger action.

In Example 44, the image-based detection method of Example 43 is disclosed, wherein the images are received by at least one camera.

In Example 45, the image-based detection method of Example 44 is disclosed, wherein the at least one camera is a depth-sensing camera.

In Example 46, the image-based detection method of Example 43 or 44 is disclosed, wherein the images of the vicinity of the control are received from at least two perspectives, and further comprising generating image depth information using the received images.

In Example 47, the image-based detection method of Examples 45 to 46 is disclosed, further comprising determining an alignment between the control and the control actuator according to depth data.

In Example 48, the image-based detection method of Example 47 is disclosed, further comprising attributing an action of the control actuator to one of a plurality of controls based on the determined alignment.

In Example 49, the image-based detection method of any one of Examples 43 to 48 is disclosed, wherein the images are received by one or more image sensors mounted in a driver well.

In Example 50, the image-based detection method of any one of Examples 43 to 48 is disclosed, wherein the images are received by one or more image sensors mounted in the control.

In Example 51, the image-based detection method of any one of Examples 43 to 50 is disclosed, wherein the vicinity of the control comprises a region anterior to a depression-surface of a brake.

In Example 52, the image-based detection method of any one of Examples 43 to 51 is disclosed, wherein the vicinity of the control includes at least a brake and an accelerator.

In Example 53, the image-based detection method of any one of Examples 43 to 52 is disclosed, further comprising at least detecting the trigger action using one or more processors on a System on Chip (SoC).

In Example 54, the image-based detection method of any one of Examples 43 to 53 is disclosed, wherein the images represent a time-resolved series of positions of the control actuator relative to the control.

In Example 55, the image-based detection method of any one of Examples 43 to 54 is disclosed, further comprising determining a distance of the control actuator from the control within at least one image.

In Example 56, the image-based detection method of any one of Examples 43 to 55 is disclosed, further comprising determining a velocity of the control actuator using the time-resolved series of positions of the control actuator relative to the control.

In Example 57, the image-based detection method of any one of Examples 43 to 56 is disclosed, further comprising determining at least two time-resolved velocities of the control actuator, and using the at least two determined time-resolved velocities, determine an acceleration of the control actuator.

In Example 58, the image-based detection method of any one of Examples 43 to 57 is disclosed, further comprising determining a period or movement or a period of non-movement of the control actuator relative to the control.

In Example 59, the image-based detection method of any one of Examples 43 to 58 is disclosed, wherein the trigger action comprises a movement of the control actuator toward the control at greater than a predetermined velocity.

In Example 60, the image-based detection method of any one of Examples 43 to 59 is disclosed, wherein the trigger action comprises a movement of the control actuator toward the control at greater than a predetermined acceleration.

In Example 61, the image-based detection method of any one of Examples 43 to 60 is disclosed, wherein the trigger action comprises a release from an accelerator and a movement toward the control within a predetermined duration.

In Example 62, the image-based detection method of any one of Examples 43 to 61 is disclosed, wherein the trigger action comprises a release from an accelerator and a movement toward the control at greater than a predetermined velocity.

In Example 63, the image-based detection method of any one of Examples 43 to 62 is disclosed, wherein the trigger action comprises the control actuator hovering relative to the control.

In Example 64, the image-based detection method of Example 63 is disclosed, wherein the trigger action comprises the control actuator hovering relative to the control for greater than a predetermined duration.

In Example 65, the image-based detection method of any one of Examples 43 to 64 is disclosed, wherein the trigger action comprises the control actuator hovering above the control within a predetermined distance from the control.

In Example 66, the image-based detection method of any one of Examples 43 to 65 is disclosed, wherein the safety mode comprises momentary engagement and release of a braking mechanism.

In Example 67, the image-based detection method of any one of Examples 43 to 66 is disclosed, wherein the safety mode comprises reducing a distance between a brake pad and a brake disc before the control is depressed.

In Example 68, the image-based detection method of any one of Examples 43 to 67 is disclosed, wherein the safety mode comprises engagement of a braking mechanism prior to contact between the control actuator and the control.

In Example 69, the image-based detection method of any one of Examples 43 to 68 is disclosed, wherein the safety mode comprises engagement of a stopping mechanism prior to contact between the control actuator and the control.

In Example 70, the image-based detection method of any one of Examples 43 to 69 is disclosed, wherein the control is a brake mechanism, and wherein the safety mode comprises providing supplemental force to the brake mechanism in excess of any force applied by the control actuator to the control.

In Example 71, the image-based detection method of any one of Examples 43 to 70 is disclosed, wherein the safety mode comprises disengaging a cruise control.

In Example 72, the image-based detection method of any one of Examples 43 to 71 is disclosed, wherein the safety mode comprises locking one or more safety belts.

In Example 73, the image-based detection method of any one of Examples 43 to 72 is disclosed, wherein the safety mode comprises adjusting one or more seats for impact.

In Example 74, the image-based detection method of any one of Examples 43 to 73 is disclosed, wherein the control is a brake.

In Example 75, the image-based detection method of any one of Examples 43 to 74 is disclosed, wherein the control is a motor vehicle brake.

In Example 76, the image-based detection method of any one of Examples 43 to 75 is disclosed, wherein the control is a pedal.

In Example 77, the image-based detection method of any one of Examples 43 to 76 is disclosed, wherein the control is a button.

In Example 78, the image-based detection method of any one of Examples 43 to 77 is disclosed, further comprising storing image data from the one or more image sensors in a memory.

In Example 79, the image-based detection method of Example 78 is disclosed, further comprising storing driver activity.

In Example 80, the image-based detection method of Example 79 is disclosed, further comprising storing at least one driver profile.

In Example 81, the image-based detection method of Examples 37 or 80 is disclosed, further comprising adjusting a predetermined actuating criterion based on at least a stored driver activity or a stored driver profile.

In Example 82, the image-based detection method of any one of Examples 43 to 81 is disclosed, further comprising changing a predetermined velocity for a trigger action based on at least a previous action of the control actuator relative to the control.

In Example 83, the image-based detection method of any one of Examples 43 to 81 is disclosed, further comprising changing a predetermined acceleration for a trigger action based on at least a previous action of the control actuator relative to the control.

In Example 84, the image-based detection method of any one of Examples 43 to 81 is disclosed, further comprising changing a predetermined duration for a trigger action based on at least a previous action of the control actuator relative to the control.

In Example 85, an image-based detection means is disclosed comprising, one or more image sensing means, configured to receive images of a vicinity of a control; and one or more processing means, configured to identify within the images a control actuator and the control; detect a trigger action of the control actuator relative to the control based on the images; and switch from a normal control mode to a safety mode according to the detected trigger action.

In Example 86, the image-based detection means of Example 85 is disclosed, wherein the one or more image sensing means comprises at least one camera.

In Example 87, the image-based detection means of Example 86 is disclosed, wherein the at least one camera is a depth-sensing camera.

In Example 88, the image-based detection means of Example 85 or 87 is disclosed, wherein the one or more image sensing means are configured to receive images of the vicinity of the control from at least two perspectives, and wherein the one or more processing means are further configured to generate image depth information using the received images.

In Example 89, the image-based detection means of any one of Examples 85 to 88 is disclosed, wherein the one or more processing means are further configured to determine an alignment between the control and the control actuator according to depth data.

In Example 90, the image-based detection means of Example 89 is disclosed, wherein the one or more processing means are further configured to attribute an action of the control actuator to one of a plurality of controls based on the determined alignment.

In Example 91, the image-based detection means of any one of Examples 85 to 90 is disclosed, wherein the one or more image sensing means are mounted in a driver well.

In Example 92, the image-based detection means of any one of Examples 85 to 90 is disclosed, wherein the one or more image sensing means are mounted in the control.

In Example 93, the image-based detection means of any one of Examples 85 to 92 is disclosed, wherein the vicinity of the control comprises a region anterior to a depression-surface of a brake.

In Example 94, the image-based detection means of any one of Examples 85 to 93 is disclosed, wherein the vicinity of the control includes at least a brake and an accelerator.

In Example 95, the image-based detection means of any one of Examples 85 to 94 is disclosed, wherein the one or more processing means are arranged as a System on Chip (SoC).

In Example 96, the image-based detection means of any one of Examples 85 to 95 is disclosed, wherein the images represent a time-resolved series of positions of the control actuator relative to the control.

In Example 97, the image-based detection means of any one of Examples 85 to 96 is disclosed, wherein the one or more processing means are configured to determine a distance of the control actuator from the control within at least one image.

In Example 98, the image-based detection means of any one of Examples 85 to 97 is disclosed, wherein the one or more processing means are configured to determine a velocity of the control actuator using the time-resolved series of positions of the control actuator relative to the control.

In Example 99, the image-based detection means of any one of Examples 85 to 98 is disclosed, wherein the one or more processing means are configured to determine at least two time-resolved velocities of the control actuator, and using the at least two determined time-resolved velocities, determine an acceleration of the control actuator.

In Example 100, the image-based detection means of any one of Examples 85 to 99 is disclosed, wherein the one or more processing means are configured to determine a period or movement or a period of non-movement of the control actuator relative to the control.

In Example 101, the image-based detection means of any one of Examples 85 to 100 is disclosed, wherein the trigger action comprises a movement of the control actuator toward the control at greater than a predetermined velocity.

In Example 102, the image-based detection means of any one of Examples 85 to 101 is disclosed, wherein the trigger action comprises a movement of the control actuator toward the control at greater than a predetermined acceleration.

In Example 103, the image-based detection means of any one of Examples 85 to 102 is disclosed, wherein the trigger action comprises a release from an accelerator and a movement toward the control within a predetermined duration.

In Example 104, the image-based detection means of any one of Examples 85 to 103 is disclosed, wherein the trigger action comprises a release from an accelerator and a movement toward the control at greater than a predetermined velocity.

In Example 105, the image-based detection means of any one of Examples 85 to 104 is disclosed, wherein the trigger action comprises the control actuator hovering relative to the control.

In Example 106, the image-based detection means of Example 105 is disclosed, wherein the trigger action comprises the control actuator hovering relative to the control for greater than a predetermined duration.

In Example 107, the image-based detection means of any one of Examples 85 to 106 is disclosed, wherein the trigger action comprises the control actuator hovering above the control within a predetermined distance from the control.

In Example 108, the image-based detection means of any one of Examples 85 to 107 is disclosed, wherein the safety mode comprises momentary engagement and release of a braking mechanism.

In Example 109, the image-based detection means of any one of Examples 85 to 108 is disclosed, wherein the safety mode comprises reducing a distance between a brake pad and a brake disc before the control is depressed.

In Example 110, the image-based detection means of any one of Examples 85 to 109 is disclosed, wherein the safety mode comprises engagement of a braking mechanism prior to contact between the control actuator and the control.

In Example 111, the image-based detection means of any one of Examples 85 to 110 is disclosed, wherein the safety mode comprises engagement of a stopping mechanism prior to contact between the control actuator and the control.

In Example 112, the image-based detection means of any one of Examples 85 to 111 is disclosed, wherein the control is a brake mechanism, and wherein the safety mode comprises providing supplemental force to the brake mechanism in excess of any force applied by the control actuator to the control.

In Example 113, the image-based detection means of any one of Examples 85 to 112 is disclosed, wherein the safety mode comprises disengaging a cruise control.

In Example 114, the image-based detection means of any one of Examples 85 to 113 is disclosed, wherein the safety mode comprises locking one or more safety belts.

In Example 115, the image-based detection means of any one of Examples 85 to 114 is disclosed, wherein the safety mode comprises adjusting one or more seats for impact.

In Example 116, the image-based detection means of any one of Examples 85 to 115 is disclosed, wherein the control is a brake.

In Example 117, the image-based detection means of any one of Examples 85 to 116 is disclosed, wherein the control is a motor vehicle brake.

In Example 118, the image-based detection means of any one of Examples 85 to 117 is disclosed, wherein the control is a pedal.

In Example 119, the image-based detection means of any one of Examples 85 to 118 is disclosed, wherein the control is a button.

In Example 120, the image-based detection means of any one of Examples 85 to 119 is disclosed, further comprising a memory, configured to store image data from the one or more image sensing means.

In Example 121, the image-based detection means of Example 120 is disclosed, wherein the memory is further configured to store driver activity.

In Example 122, the image-based detection means of Example 121 is disclosed, wherein the memory is further configured to store at least one driver profile.

In Example 123, the image-based detection means of Examples 121 or 122 is disclosed, wherein the one or more processing means are further configured to modify an element of a trigger action based on at least a stored driver activity or a stored driver profile.

In Example 124, the image-based detection means of any one of Examples 85 to 123 is disclosed, wherein the one or more processing means are further configured to change a predetermined velocity for a trigger action based on at least a previous action of the control actuator relative to the control.

In Example 125, the image-based detection means of any one of Examples 85 to 123 is disclosed, wherein the one or more processing means are further configured to change a predetermined acceleration for a trigger action based on at least a previous action of the control actuator relative to the control.

In Example 126, the image-based detection means of any one of Examples 85 to 123 is disclosed, wherein the one or more processing means are further configured to change a predetermined duration for a trigger action based on at least a previous action of the control actuator relative to the control.

In Example 127, a non-transient computer readable medium is disclosed, configured to perform the method of receiving images of a vicinity of a control; identifying within the images a control actuator and the control; detecting a trigger action of the control actuator relative to the control based on the images; and switching from a normal control mode to a safety mode according to the detected trigger action.

In Example 128, a non-transient computer readable medium is disclosed, configured to perform any of the methods of Examples 43 through 84.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

What is claimed is:

1. An image-based detection system comprising,
one or more image sensors, configured to
receive images of a vicinity of a control; and
one or more processors, configured to
identify within the images a control actuator and the control;
detect a trigger action of the control actuator relative to the control based on the images; and
switch from a normal control mode to a safety mode according to the detected trigger action;
wherein the trigger action comprises a movement of the control actuator toward the control at greater than a predetermined acceleration.

2. The image-based detection system of claim 1, wherein the one or more processors are further configured to determine an alignment between the control and the control actuator according to depth data and to attribute an action of the control actuator to one of a plurality of controls based on the determined alignment.

3. The image-based detection system of claim 1, wherein the one or more image sensors are mounted in a driver well.

4. The image-based detection system of claim 1, wherein the images represent a time-resolved series of positions of the control actuator relative to the control.

5. The image-based detection system of claim 4, wherein the one or more processors are configured to determine a velocity of the control actuator using the time-resolved series of positions of the control actuator relative to the control.

6. The image-based detection system of claim 4, wherein the one or more processors are configured to determine at least two time-resolved velocities of the control actuator, and using the at least two determined time-resolved velocities, determine an acceleration of the control actuator.

7. The image-based detection system of claim 1, wherein the trigger action comprises a movement of the control actuator toward the control at greater than a predetermined velocity.

8. The image-based detection system of claim 1, wherein the trigger action comprises a release from an accelerator and a movement toward the control at greater than a predetermined velocity.

9. The image-based detection system of claim 1, wherein the safety mode comprises momentary engagement and release of a braking mechanism.

10. The image-based detection system of claim 1, wherein the safety mode comprises reducing a distance between a brake pad and a brake disc before the control is depressed.

11. The image-based detection system of claim 1, wherein the safety mode comprises engagement of a braking mechanism prior to contact between the control actuator and the control.

12. The image-based detection system of claim 1, wherein the safety mode comprises engagement of a stopping mechanism prior to contact between the control actuator and the control.

13. The image-based detection system of claim 1, wherein the control is a motor vehicle brake.

14. An image-based detection method comprising:
receiving images of a vicinity of a control;
identifying within the images a control actuator and the control;
detecting a trigger action of the control actuator relative to the control based on the images; and
switching from a normal control mode to a safety mode according to the detected trigger action;
wherein the trigger action comprises a movement of the control actuator toward the control at greater than a predetermined acceleration.

15. The image-based detection method of claim 14, further comprising determining an alignment between the control and the control actuator according to depth data and attributing an action of the control actuator to one of a plurality of controls based on the determined alignment.

16. An image-based driver action detector comprising,
one or more processors, configured to
identify, in image sensor data representing images of a vicinity of a control, a control actuator and the control;
detect a trigger action of the control actuator relative to the control based on the images;
determine a trigger action threshold from a profile of the driver;
if the trigger action exceeds the trigger action threshold, switch from a normal control mode to a safety mode; and
if the trigger action does not exceed the trigger action threshold, do not switch to the safety mode;
wherein switching from a normal control mode to a safety mode comprises reduction of a volume of an entertainment system or disengagement of cruise control.

17. The image-based detector of claim 16, wherein the trigger action comprises a velocity or an acceleration of the control actuator relative to the control.

18. The image-based detector of claim 16, wherein determining the trigger action threshold comprises determining a threshold value based on one or more previous actions of the driver associated with the profile.

* * * * *